(12) United States Patent
Rink

(10) Patent No.: US 10,436,255 B2
(45) Date of Patent: Oct. 8, 2019

(54) ROLLING ELEMENT BEARING COMPRISING AN INTEGRATED LUNDELL ALTERNATOR, AND A LUNDELL ALTERNATOR

(71) Applicant: Schaeffler Technologies AG & Co. KG, Herzogenaurach (DE)

(72) Inventor: Thomas Rink, Waldfenster (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 320 days.

(21) Appl. No.: 15/304,697

(22) PCT Filed: Mar. 4, 2015

(86) PCT No.: PCT/DE2015/200119
§ 371 (c)(1),
(2) Date: Oct. 17, 2016

(87) PCT Pub. No.: WO2015/158338
PCT Pub. Date: Oct. 22, 2015

(65) Prior Publication Data
US 2017/0045089 A1  Feb. 16, 2017

(30) Foreign Application Priority Data
Apr. 15, 2014 (DE) .......................... 10 2014 207 209

(51) Int. Cl.
*F16C 41/00* (2006.01)
*H02K 7/18* (2006.01)
(Continued)

(52) U.S. Cl.
CPC ............ *F16C 41/004* (2013.01); *H02K 1/145* (2013.01); *H02K 7/1846* (2013.01); *H02K 7/1869* (2013.01); *H02K 7/08* (2013.01)

(58) Field of Classification Search
CPC ...... F16C 41/04; F16C 32/04; F16C 32/0412; F16C 32/0444; F16C 32/0446;
(Continued)

(56) References Cited

U.S. PATENT DOCUMENTS 8,890,383 B2    11/2014  Rink
2007/0257574 A1*  11/2007  Kim .................. H02K 5/163
                                                    310/90
(Continued)

FOREIGN PATENT DOCUMENTS

DE   102009031609   1/2011
DE   102010018472   1/2011
(Continued)

*Primary Examiner* — Forrest M Phillips
(74) *Attorney, Agent, or Firm* — Volpe and Koenig, P.C.

(57) ABSTRACT

The invention relates to a rolling element bearing comprising a first bearing ring, a second bearing ring, and a claw-pole alternator that is arranged between said two bearing rings. The claw-pole alternator includes a sequence of magnetic poles running along the first bearing ring, a sequence of magnetically-conductive claws arranged along the circumference of the second bearing ring, and a coil. Together the claws and the poles form magnetic rings that surround said coil. It is essential to the invention that the magnetically-conductive claws are only arranged along some sections of the circumference of said second bearing ring. The coil is arranged in the region of said magnetically-conductive claws. The invention also relates to a claw-pole alternator for installing in a rolling element bearing.

11 Claims, 2 Drawing Sheets

(51) Int. Cl.
  *H02K 1/14* (2006.01)
  *H02K 7/08* (2006.01)
(58) Field of Classification Search
  CPC .............. F16C 32/0453; F16C 32/0461; F16C 32/0465; F16C 32/0474; F16C 32/0478; F16C 32/048; F16C 19/00; H02K 1/14; H02K 1/145; H02K 7/1846; H02K 7/1869; H02K 3/325
  USPC .......................................... 310/90, 90.5, 67 R
  See application file for complete search history.

(56) References Cited

U.S. PATENT DOCUMENTS

| | | | | |
|---|---|---|---|---|
| 2008/0001487 | A1* | 1/2008 | Wei | H02K 1/20 310/54 |
| 2008/0007128 | A1* | 1/2008 | Murakami | H02K 1/32 310/58 |
| 2008/0093950 | A1 | 4/2008 | Cros et al. | |
| 2008/0136294 | A1* | 6/2008 | Powers | H02K 21/029 310/67 R |
| 2009/0079303 | A1* | 3/2009 | Zhang | H02K 5/1675 310/67 R |
| 2012/0169166 | A1 | 7/2012 | Rink et al. | |
| 2012/0326573 | A1* | 12/2012 | Yamamoto | B60K 7/0007 310/67 R |
| 2014/0079350 | A1 | 3/2014 | Rink et al. | |
| 2014/0086519 | A1* | 3/2014 | Rink | F16C 23/086 384/497 |
| 2015/0263572 | A1* | 9/2015 | Hyppias | H02K 29/03 310/83 |

FOREIGN PATENT DOCUMENTS

| | | |
|---|---|---|
| DE | 102010021159 | 11/2011 |
| DE | 102010021160 | 11/2011 |
| DE | 102010022369 | 12/2011 |
| DE | 102011075547 | 11/2012 |
| DE | 102011075548 | 11/2012 |
| DE | 102011082804 | 3/2013 |
| EP | 0594550 | 4/1994 |
| EP | 1906509 | 4/2008 |
| JP | 2004132447 | 4/2004 |
| WO | 2013160035 | 10/2013 |

\* cited by examiner

ROLLING ELEMENT BEARING COMPRISING AN INTEGRATED LUNDELL ALTERNATOR, AND A LUNDELL ALTERNATOR

FIELD OF THE INVENTION

The present invention relates to a rolling element bearing with integrated claw-pole alternator. The invention also relates to a claw-pole alternator for use in a rolling element bearing.

BACKGROUND

Rolling element bearings comprise, as bearing rings that can rotate opposite each other, an inner ring and an outer ring. Different bearing applications require, for example, the detection of rotational speed and direction of rotation or other monitoring tasks of the rotating bearing part. These and other tasks require electronic components, such as sensors, actuators, processors, and data memories.

From the prior art it is known to use generators in rolling element bearings that provide the necessary energy to the electronic components present there with little expense. There are solutions that use so-called claw-pole alternators. Known claw-pole alternators comprise a first claw ring with a sequence of first claws running in the circumferential direction of the rolling element bearing, a second claw ring with a sequence of second claws running in the circumferential direction of the rolling element bearing, and an induction coil that is surrounded by the two claw rings and surrounds the rotational axis of the rolling element bearing. The claw pole rings are arranged offset relative to each other in the circumferential direction. The claw-pole alternator further comprises a sequence of magnetic poles running in the circumferential direction. If a first claw of the first claw ring is opposite a first pole, for example, a north pole, a magnetic circuit is formed via a second claw of the second claw ring adjacent in the circumferential direction to a second, complementary magnetic pole, in this case a south pole, which is adjacent in the circumferential direction and surrounds the induction coil. If the bearing ring with the two claw rings continues to rotate, the second claw is opposite a north pole and the first claw is opposite a south pole, so that the direction of the magnetic circuit surrounding the induction coil reverses and an electric voltage is induced in the induction coil.

DE 10 2011 075 548 A1 describes a bearing with a first and a second bearing ring and an energy generating unit formed as a claw-pole alternator. The claw-pole alternator comprises a first claw ring with a sequence of first claws and a second claw ring offset in the circumferential direction of the rotational axis with a sequence of second claws. The two claw rings surround an induction coil surrounding the rotational axis. Claw rings and induction coils are mounted with a first carrier ring on an end face of the first bearing ring. A sequence of magnetic poles surrounding the rotational axis is mounted by means of a second carrier ring on the end face of the second bearing ring. The magnetic poles are connected to each other in a magnetically conductive manner by a yoke ring made from a magnetically conductive material. The two claw rings are connected in a magnetically conductive manner with the help of a flux conducting ring.

In DE 10 2009 031 609 A1, a rolling element bearing with a claw-pole alternator arranged between a first and second bearing ring is described. The claw-pole alternator comprises a sequence of magnetic pole pairs wrapping around the circumference of the second bearing ring, a claw ring mounted on the first bearing ring with a sequence of claws wrapping around a circumference of the first bearing ring, and a magnetic induction coil. A first claw of the claw ring is arranged in magnetically conductive connection to a magnetically conductive section of the body of the first bearing ring. The magnetic poles of the pole pairs are arranged in magnetically conductive connection to a magnetically conductive section of the body of the second bearing ring. The magnetic circuit is closed by the two magnetic sections and the rolling element body.

DE 10 2010 022 369 A1 shows a rolling element bearing with a claw-pole alternator arranged between the first and second bearing ring. The claw-pole alternator comprises a sequence of magnetic poles wrapping around the first bearing ring, a sequence of magnetically conductive claws wrapping around the second bearing ring, and an induction coil that is arranged on a cage used for holding the rolling element body.

DE 10 2011 075 547 A1 includes a rolling element bearing with a claw-pole alternator that is arranged between the first and second bearing ring and whose magnetic poles are arranged on a cage used for holding the rolling element bodies.

DE 10 2011 082 804 A1 is designed with a rolling element bearing with integrated claw-pole alternator comprising a first claw ring with a sequence of first claws and a second claw ring offset in the circumferential direction of the rotational axis of the bearing with a sequence of second claws. The claw rings surround an induction coil surrounding the rotational axis. Claw rings and induction coils are mounted on an end face of a first bearing ring. A sequence of magnetic poles is mounted on a second bearing ring and connected to each other in a magnetically conductive manner by means of a yoke ring made from a magnetically conductive material. The two claw rings are connected in a magnetically conductive manner by a magnetically conductive section of an axial fastening element, in particular, by a lock nut or slotted nut.

Previously known solutions use claw-pole alternators that are arranged around the entire circumference of the rolling element bearing. In this way, they are depending on the diameter of the rolling element bearing and cannot be used universally.

DE 10 2010 021 159 A1 shows a rolling element bearing with a salient pole machine with a primary part and a secondary part that are each connected locked in rotation to one of the bearing rings. The secondary part is formed by permanent magnets that are arranged with alternating polarity in the circumferential direction of the bearing ring. The generator has a modular design so that it can be integrated into different bearing types. To do this, the permanent magnets are embedded in a secondary carrier. The primary part comprises salient poles each with an individual pole winding that are embedded in a primary carrier. Primary and secondary carriers must be designed so that they can be finished to form the generator independent of the final installation diameter. The primary and secondary parts must not extend past the entire circumference of a rolling element bearing, but instead can also extend in some sections between the bearing rings. In this case, a compensating weight must be provided on the diametrically opposite section of the generator. Alternatively, a second generator could also be provided in an opposite arrangement.

SUMMARY

The object of the present invention is to disclose a rolling element bearing with an integrated claw-pole alternator, wherein the claw-pole alternator is designed to be usable for different bearing diameters and can be produced economically.

To achieve this objective, a rolling element bearing and a claw-pole alternator according to the invention are used. The rolling element bearing according to the invention comprises a first and a second bearing ring and a claw-pole alternator arranged between the two bearing rings. The claw-pole alternator is formed of a sequence of magnetic poles wrapping around the circumference of the first bearing ring, a sequence of magnetically conductive claws arranged along the circumference of the second bearing ring, and a coil. The claws form, together with the poles, magnetic circuits surrounding the coil. It is essential to the invention that the magnetically conductive claws are arranged only in some sections along the circumference of the second bearing ring. The coil is arranged in the area of the magnetically conductive claws.

One essential advantage of the solution according to the invention is in being able to use the claw-pole alternator for different rolling element bearing sizes and designs based on its construction. The claw-pole alternator can be easily dimensioned in terms of power with different bearing diameters. This is enabled, in particular, by the section-wise arrangement of the magnetic claws. In addition, the magnetic poles can be provided with different geometries. Due to its simple construction, the claw-pole alternator is suitable for mass production and thus can be produced economically. The claw-pole alternator can be later installed in a rolling element bearing in order to equip a standard bearing with a power supply.

According to one preferred embodiment, the claw-pole alternator comprises two axially opposite magnetically conductive claw plates with radially extending side surfaces and claws angled in the axial direction. The claws of the claw plates are here arranged intermeshing with each other in an alternating manner. The coil is surrounded by the claw plates. The length of the claw plate defines the number of pole pairs and thus the electrical power class. Through geometric offset (resulting in an electrical phase shift) of the two claw plates in the circumferential direction relative to each other, a suitable voltage shape can be provided for converting the alternating voltage induced by the coil into a direct voltage. This produces a 2-phase system. The geometric offset can be created by the magnetic poles (two independent magnetic circuits) or by claw plates offset by a pole division factor.

In one advantageous embodiment, the side surfaces of the claw plate have radial slots. Due to the slots, the claw plates can be adapted to the respective bearing circumference by a bending process with little expense.

The two claw plates and the coil can be combined to form a common structural unit that is to be mounted on the second bearing ring. For increasing the mechanical and chemical protection of the entire structural unit, these can be encapsulated, wherein fasteners used to mount the structural unit can also be encapsulated, for example, sleeves as screw passage openings. By combining claw plates and coils to form a compact structural unit, the assembly expense is also reduced.

One advantageous embodiment uses a first carrier ring for carrying the magnetic poles and/or a second carrier ring for mounting the claw plates and the coil. The poles can be designed as individual permanent magnets that are embedded in the circumferential surface of the first carrier ring. Alternatively, the first carrier ring can have magnetized sections alternating in the circumferential direction on its circumferential surface. The first carrier ring is preferably mounted by means of a magnetically conductive adhesive on the first bearing ring. The second bearing ring can be attached, for example, by a press fit on the second bearing ring. The use of the carrier rings enables a low-expense assembly or disassembly of the claw-pole alternator.

The magnetic yoke is realized preferably by a rolling element bearing component, for example, by one of the two bearing rings.

The coil is preferably designed as a ring coil. In addition, the coil is finally wound according to one preferred embodiment and the individual windings are bonded to each other, wherein a self-supporting coil, a so-called Backlack coil. The coil is placed before the bending process of the claw pole plates and is adapted to the required diameter by the subsequent bending process.

Between the two claw plates there is preferably a flexible carrier for holding power electronic components, for example, a rectifier. In this way, the power electronic components can be integrated in a packaging space-neutral manner in the packaging space used for holding the coil.

For realizing a transformer power transform, the rolling element can have a second identical claw-pole alternator. The two claw-pole alternators are here arranged axially opposite each other in the rolling element bearing. The initiation of the electromagnetic power transfer is triggered by overlap of the primary and secondary claw-pole alternator, also for partial overlap, which must equal, however, at least one pole pair. The overlap of the primary and secondary claw-pole alternator can be identified by means of an induced voltage in the primary circuit by the first secondary pole pair element (secondary claw-pole alternator with residual magnetism or magnetically biased).

The magnetic circuit can be used as an active target for detecting the rotational speed and direction of rotation and for determining the angular position. As the sensor element, for example, a Hall sensor, a magneto-resistive sensor (XMR) or a differential transformer can be used. The temperature of the claw-pole alternator can be detected by the winding resistance of the coil. The rolling element bearing temperature can be determined from the temperature of the claw-pole alternator.

A claw-pole alternator according to the invention comprises a sequence of magnetic poles that are arranged circumferentially on a first carrier ring, two axially opposite claw plates with radially extending side surfaces and claws angled in the axial direction, as well as a coil surrounded by the claw plates. The claw plates are constructed as circular arcs according to the invention.

Other advantageous embodiments of the present invention can be found in the dependent claims.

BRIEF DESCRIPTION OF THE DRAWINGS

A preferred embodiment of the invention is explained in more detail below with reference to the attached figures. Shown are.

DETAILED DESCRIPTION OF THE PREFERRED EMBODIMENTS

Figure 1:
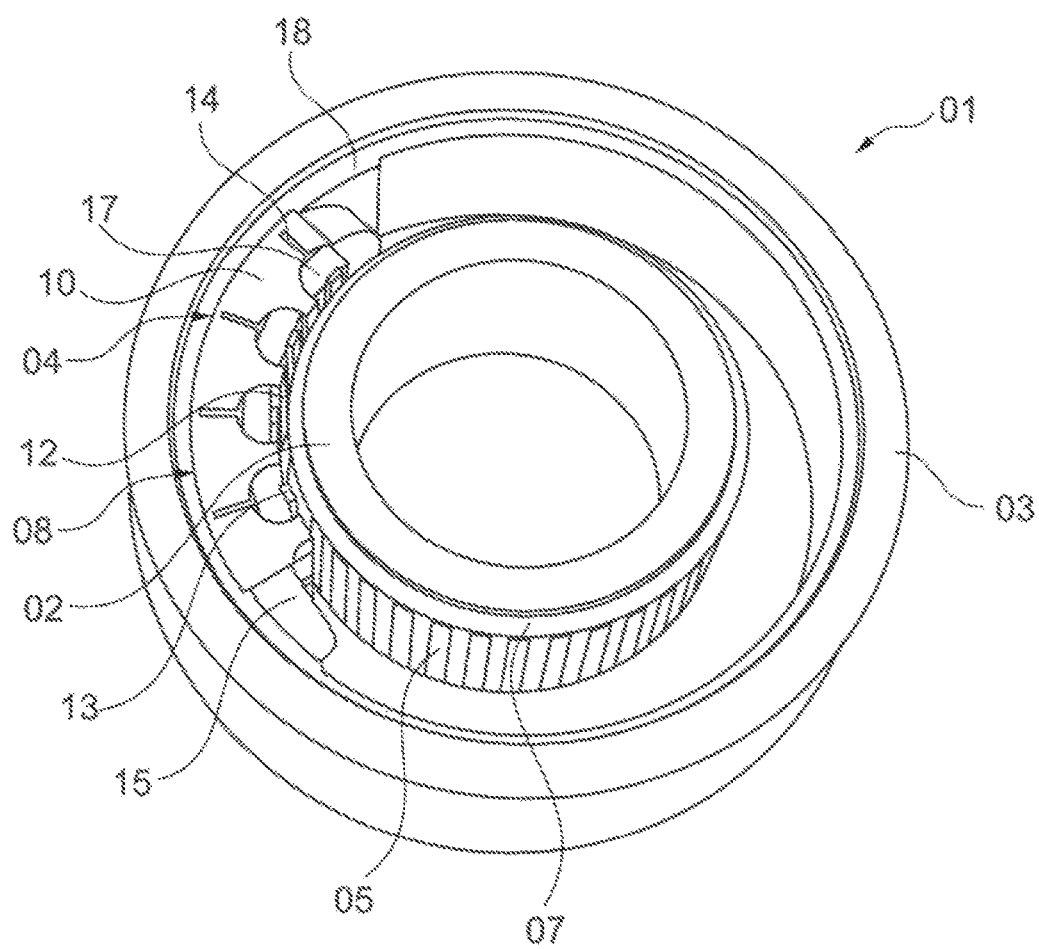
FIG. 1 a perspective view of a rolling element bearing according to the invention, and FIG. 2 a perspective view of a claw-pole alternator according to the invention.
Figure 2:
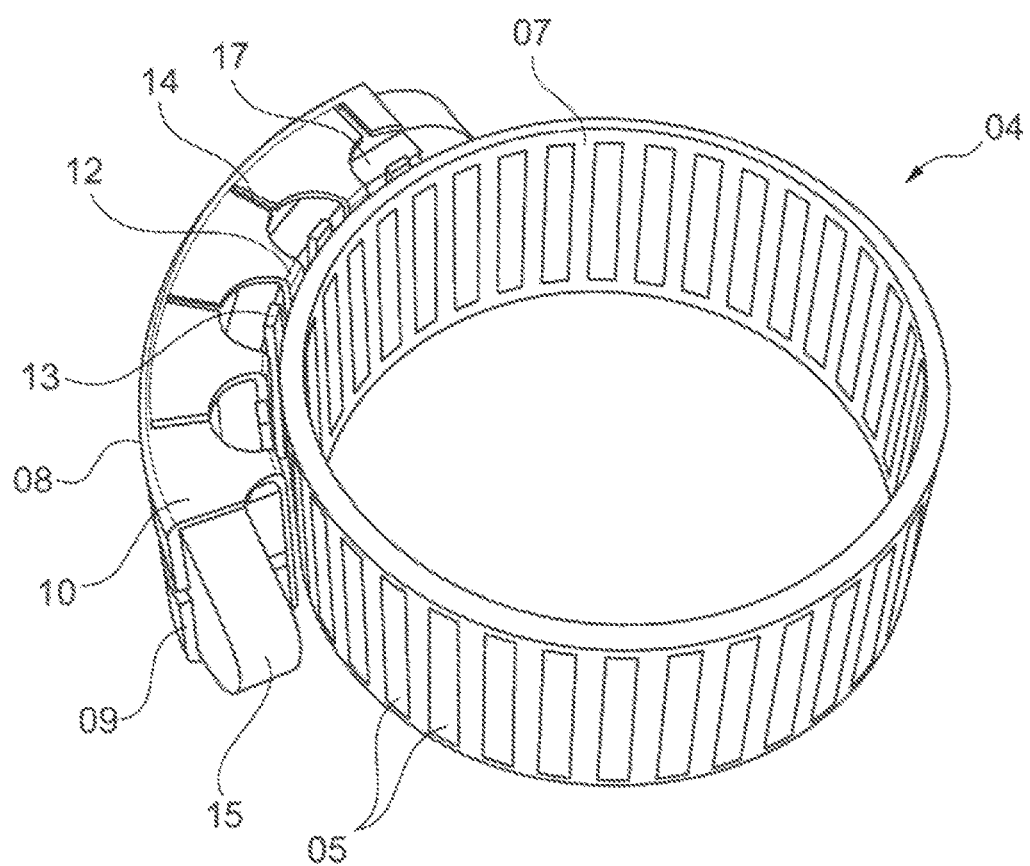

FIG. 1 shows a perspective view of a rolling element bearing 01 according to the invention. The rolling element bearing 01 is formed of an inner ring 02, an outer ring 03, and rolling elements (not shown) arranged in-between. Between the inner ring 02 and outer ring 03 there is, on one side of the rolling element, a claw-pole alternator 04 that is shown separately in FIG. 2. The claw-pole alternator 04 comprises a sequence of magnetic poles 05 surrounding the inner ring 02. The magnetic poles 05 are arranged on a first carrier ring 07. They can be realized, for example, as permanent magnets embedded in the surface of the first carrier ring 07. For alternative designs, the first carrier ring 07 can have magnetic sections alternating in the circumferential direction on its circumferential surface. The first carrier ring 07 is preferably mounted on the inner ring 02 by an adhesive connection.

The claw-pole alternator 04 further comprises a first and a second arc-shaped magnetically conductive claw plate 08, 09 (see FIG. 2) that are arranged axially opposite each other. The claw plates 08, 09 have radially extending side surfaces 10 and claws 12, 13 angled in the axial direction. The claws 12 of the first claw plate 08 and the claws 13 of the second claw plate 09 are arranged intermeshing in each other in an alternating manner. In the side surfaces 10 of the claw plates 08, 09 there are axial slots 14. Due to the axial slots 14, the claw plates 08, 09 can be bent with little expense, by which they can be adapted to different diameters.

Between the claw plates 08, 09 there is a coil 15 that is constructed preferably as a self-supporting coil. The coil 15 is placed before the bending process of the claw plates 08, 09 and is adapted to the necessary diameter by the subsequent bending process. In the packaging space between the claw plates 08, 09 there is also a flexible carrier 17 that is used for holding electronic components (not shown).

Claw plates 08, 09 and coil 15 are preferably combined into a structural unit. This structural unit can be encapsulated and mounted on the outer ring 03 of the rolling element bearing 01. For the embodiment shown in FIG. 1, claw plates 08, 09 and coil 15 are mounted on a second carrier ring 18 that is mounted in turn on the outer ring 03. Claw plates 08, 09 and coil 15 could also be mounted alternatively directly on the outer ring 03. The use of a separate carrier ring 18, however, simplifies the assembly or disassembly of claw plates 08, 09 and coil 15.

The magnetic flux goes from a first pole, for example, a north pole, into the claw 12, 13 of one of the two claw plates 08, 09 opposite the pole, from there it surrounds the coil 15, and exits at the adjacent claw 12, 13 of the other of the two claw plates 08, 09 back to the adjacent south pole. If the outer ring 03 carrying the two claw plates 12, 13 turns further, the direction of the magnetic flux surrounding the coil 15 reverses, so that an electrical voltage is induced in the coil 15.

The claw-pole alternator can naturally also be integrated in the reverse arrangement in a rolling element bearing 01. In this case, the magnetic poles 05 would be arranged on the outer ring 03 and the claw plates 08, 09 would be arranged on the inner ring 02.

The magnetic yoke can be realized by one of the two bearing rings 02, 03.

LIST OF REFERENCE NUMBERS

01 Rolling element bearing
02 Inner ring
03 Outer ring
04 Claw-pole alternator
05 Magnetic poles
06 —
07 First carrier ring
08 First claw plate
09 Second claw plate
10 Side surfaces of the claw plates
11 —
12 First claws
13 Second claws
14 Slots
15 Coil
16 —
17 Flexible carrier
18 Second carrier ring

The invention claimed is:

1. A rolling element bearing comprising:
a first bearing ring,
a second bearing ring, and
a claw-pole alternator arranged between the first and the second bearing rings comprising a circumferential sequence of magnetic poles along the first bearing ring, a sequence of magnetically conductive claws arranged along a circumference of the second bearing ring, and
a coil,
the magnetically conductive claws and the poles form magnetic circuits surrounding the coil,
the magnetically conductive claws are arranged only in some sections along the circumference of the second bearing ring and the coil is arranged in an area of the magnetically conductive claws, and
the side surfaces of the claw plates have radially extending slots imparting flexibility of the claw plates such that the claw plates are adaptable to at least two bearing diameters of varying sizes.

2. The rolling element bearing according to claim 1, wherein the claw-pole alternator comprises two magnetically conductive claw plates opposite each other in an axial direction with side surfaces extending in a radial direction and the claws are angled in the axial direction, the claws of the claw plates are arranged in an alternating, intermeshing manner, and the coil is surrounded by the claw plates.

3. The rolling element bearing according to claim 2, wherein the claw plates are arranged offset relative to each other by a pole division factor.

4. The rolling element bearing according to claim 2, wherein the claw plates and the coil are assembled to form a common structural unit that is mounted on the second bearing ring.

5. The rolling element bearing according to claim 2, further comprising at least one of a first carrier ring for carrying the magnetic poles or a second carrier ring for fastening the claw plates and the coil.

6. The rolling element bearing according to claim 2, further comprising a flexible carrier for holding electronic components located between the claw plates.

7. The rolling element bearing according to claim 1, further comprising a magnetic yoke realized by a rolling element bearing component.

8. The rolling element bearing according to claim 1, further comprising a second claw-pole alternator arranged opposite to the claw-pole alternator in an axial direction in the rolling element bearing.

9. The rolling element bearing according to claim 1, wherein the radially extending slots are each open in a radially inward direction.

10. The rolling element bearing according to claim 1, wherein the coil has a total circumferential extent that is less than the circumference of the second bearing ring.

11. A claw-pole alternator for use in a rolling element bearing, the claw-pole alternator comprising:
- a sequence of magnetic poles arranged circumferentially on a first carrier ring,
- two claw plates opposite each other in an axial direction with radially extending side surfaces, and claws angled in the axial direction, the claws of the claw plates are arranged in an alternating, intermeshing manner, and
- a coil surrounded by the claw plates, and
- the side surfaces of the claw plates have radially extending slots imparting flexibility of the claw plates such that the claw plates are adaptable to at least two bearing diameters of varying sizes.

* * * * *